US008808075B2

(12) United States Patent
Gebke et al.

(10) Patent No.: US 8,808,075 B2
(45) Date of Patent: Aug. 19, 2014

(54) CONFIGURABLE PLIABLE AIR DUCTS

(75) Inventors: Kevin J. Gebke, Dubuque, IA (US);
Frank Heim, Platteville, WI (US);
Michael Hermes, Dubuque, IA (US);
Michael A. Jacobson, Dubuque, IA (US); Nicholas L. Kaufmann, Sherill, IA (US); William A. Niehaus, Holy Cross, IA (US)

(73) Assignee: Rite-Hite Holding Corporation, Milwaukee, WI (US)

( * ) Notice: Subject to any disclaimer, the term of this patent is extended or adjusted under 35 U.S.C. 154(b) by 685 days.

(21) Appl. No.: 12/834,703

(22) Filed: Jul. 12, 2010

(65) Prior Publication Data
US 2012/0006442 A1 Jan. 12, 2012

(51) Int. Cl.
*F24F 7/00* (2006.01)
(52) U.S. Cl.
USPC ........... 454/297; 454/903; 454/290; 454/303; 138/118; 428/131
(58) Field of Classification Search
USPC ............................ 454/297; 138/118; 428/131
See application file for complete search history.

(56) References Cited

U.S. PATENT DOCUMENTS

| 1,211,067 | A | * | 1/1917 | Braly | 285/12 |
| 2,595,408 | A | * | 5/1952 | Quest | 405/40 |
| 2,839,080 | A | * | 6/1958 | Copeland | 137/625.4 |
| 3,659,515 | A | * | 5/1972 | Galaniuk | 454/152 |
| 3,699,872 | A | * | 10/1972 | Kruger | 454/303 |
| 3,705,736 | A | * | 12/1972 | Dawson | 285/260 |
| 4,337,791 | A | * | 7/1982 | Tech et al. | 137/556 |
| 4,558,526 | A | * | 12/1985 | Baus | 34/232 |
| 4,796,803 | A | * | 1/1989 | Kelley | 236/49.4 |
| 5,111,739 | A | | 5/1992 | Hall | |
| 5,769,708 | A | | 6/1998 | Paschke | |
| 5,782,290 | A | * | 7/1998 | Cook | 165/231 |

(Continued)

FOREIGN PATENT DOCUMENTS

| DE | 20010135 | 8/2000 |
| GB | 1287046 | 8/1972 |
| JP | 2007315079 | 12/2007 |
| WO | 2006119399 | 11/2006 |

OTHER PUBLICATIONS

Boes—USA Industries.*
fans-airflow-vs-static-pressure—2008.*

(Continued)

*Primary Examiner* — Kang Hu
*Assistant Examiner* — Nathaniel Herzfeld
(74) *Attorney, Agent, or Firm* — Hanley, Flight and Zimmerman, LLC

(57) ABSTRACT

In some example pliable air duct systems, inflatable ducts of various diameters and lengths are created by selectively assembling pre-existing stock pieces in different combinations. In some examples, the stock pieces include disconnectable longitudinal joints and disconnectable circumferential joints, wherein the longitudinal joints enable interconnecting multiple stock pieces to achieve a desired tube diameter, and the circumferential joints allow connecting multiple tube segments end-to-end to produce an air duct assembly of a desired length. To control the volume and/or the direction of air discharged from the duct, the duct assembly, in some examples, includes an adjustable register comprising a movable pliable sheet that overlies a discharge opening in a pliable sidewall of the duct. In some examples, the inflatable duct includes one or more cutout patterns on the duct's sidewall to provide guidance in creating a sidewall discharge opening of a proper size and location.

9 Claims, 15 Drawing Sheets

(56) References Cited

U.S. PATENT DOCUMENTS

| | | | |
|---|---|---|---|
| 5,948,509 | A | 9/1999 | Felson |
| 6,280,320 | B1* | 8/2001 | Paschke et al. ............. 454/298 |
| 6,899,615 | B2 | 5/2005 | Gebke |
| 8,155,778 | B1 | 4/2012 | Barcock |
| 8,676,545 | B2 | 3/2014 | Kaufmann et al. |
| 2003/0022617 | A1 | 1/2003 | Gebke et al. |
| 2003/0028175 | A1* | 2/2003 | D'Antonio ............. 604/541 |
| 2004/0229559 | A1 | 11/2004 | Gebke et al. |
| 2006/0252365 | A1* | 11/2006 | Gebke ................... 454/306 |
| 2008/0113610 | A1* | 5/2008 | Brown et al. .............. 454/339 |
| 2008/0176506 | A1* | 7/2008 | Gebke et al. ............. 454/284 |
| 2009/0227194 | A1* | 9/2009 | Johnston .................. 454/152 |
| 2010/0048121 | A1* | 2/2010 | Klopfenstein et al. ....... 454/186 |
| 2010/0194105 | A1 | 8/2010 | Paquet et al. |
| 2011/0269390 | A1* | 11/2011 | Pinkalla et al. ............ 454/284 |
| 2012/0010752 | A1 | 1/2012 | Kaufmann et al. |

OTHER PUBLICATIONS

Bores—USA industries—Dec. 28, 2008.*

International Searching Authority, "International Search Report", issued in connection with international application serial No. PCT/US2011/043542, mailed on Oct. 18, 2011, 3 pages.

International Searching Authority, "Written Opinion", issued in connection with international application serial No. PCT/US2011/042542, mailed on Oct. 18, 2011, 7 pages.

International Searching Authority, "Written Opinion," issued in connection with International Patent Application No. PCT/US2011/030747, mailed on Nov. 24, 2011, 10 pages.

International Searching Authority, "Search Report," issued in connection with International Patent Application No. PCT/US2011/030747, mailed on Nov. 24, 2011, 6 pages.

International Bureau, "International Preliminary Report on Patentability," issued in connection with International Patent Application No. PCT/US2011/030747, mailed on Nov. 15, 2012 (11 pages).

IP Austalia, "Examination Report," issued in connection with Australian Patent Application No. 2011248926, dated Apr. 22, 2013 (2 pages).

United States Patent and Trademark Office, "Non-Final Office Action," issued in connection with U.S. Appl. No. 12/772,863, mailed on Oct. 11, 2013, 35 pages.

USPTO, "Restriction Requirement," issued in connection with U.S. Appl. No. 12/772,863, dated Jun. 7, 2013 (7 pages).

International Searching Authority, "Invitation to Pay Additional Fees and Partial Search Report," issued in connection with international application serial No. PCT/US2011/030747, mailed Jul. 11, 2011, 7 pages.

Australian Intellectual Property Office "Notice of Acceptance," issued in connection with the Australian Patent Application Serial No. 2011248926, mailed on Apr. 3, 2014, 3 pages.

Canadian Intellectual Property Office, "Office Action", issued in connection with Canadian patent application No. 2,797,460, mailed on May 23, 2014, 4 pages.

United States Patent and Trademark Office, "Non-Final Office action," issued in connection with the U.S. Appl. No. 12/772,863, mailed on Apr. 9, 2014, 27 pages.

* cited by examiner

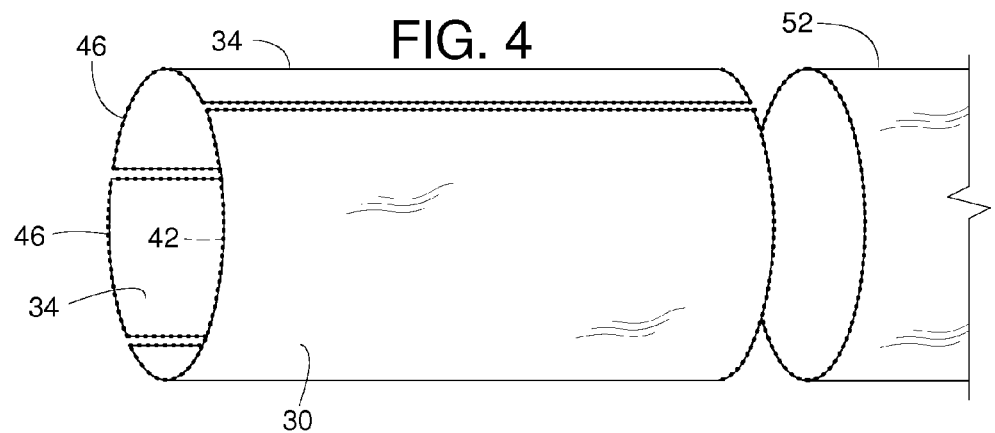
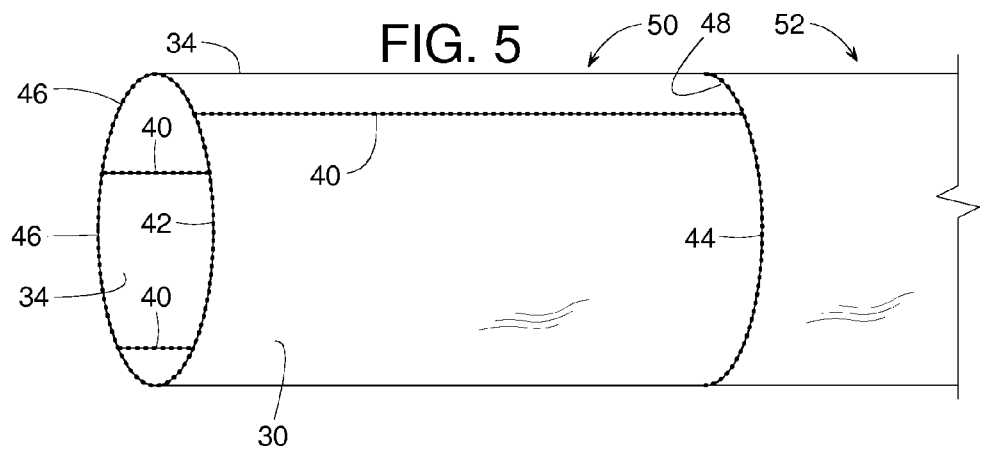
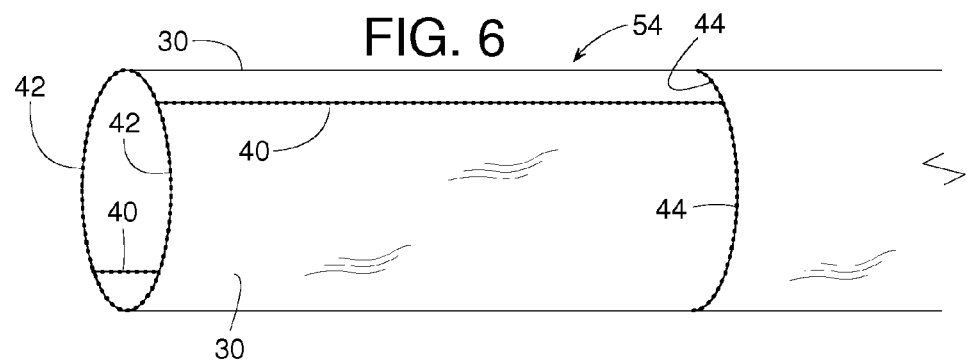
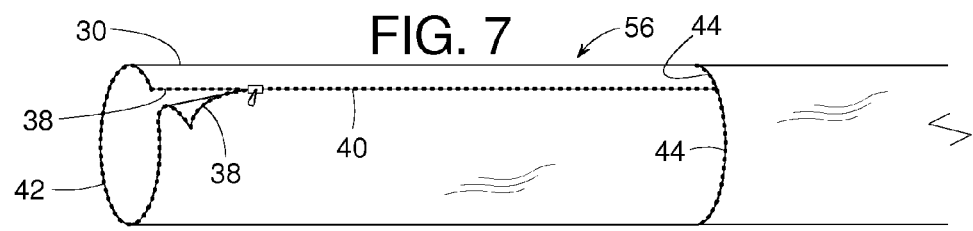

CONFIGURABLE PLIABLE AIR DUCTS

FIELD OF THE DISCLOSURE

This patent generally pertains to pliable inflatable air ducts and, more specifically, to features that enable such ducts to be selectively set up in various configurations.

BACKGROUND

Sheet metal ductwork is often used for conveying conditioned air to a comfort zone, such as a room or other area(s) of a building. Metal ducts, however, can be expensive, unsightly, and susceptible to condensation. Consequently, inflatable air ducts, such as those made of pliable fabric, are often preferred over conventional sheet metal air ducts.

Inflatable air ducts typically include an inflatable tube made of fabric or otherwise pliable material and are used for conveying conditioned air to comfort zones. A blower at the inlet of the duct is selectively activated to supply conditioned air as needed. The air discharged from the blower inflates the duct to create a radially expanded tubular conduit that conveys the air along the length of the inflated tube. The pliable wall of the tube may be porous and/or may be perforated along a length of the tube for evenly or strategically dispersing air from within the duct into the areas being conditioned or ventilated.

Inflatable air ducts are often suspended from a horizontal cable or track mounted just below the ceiling of a building. In other examples, inflatable ducts are installed beneath a floor and supply conditioned air to a comfort zone by releasing the air up through one or more openings in the floor.

BRIEF DESCRIPTION OF THE DRAWINGS

FIG. 4 is a perspective view of example sidewall pieces about to be assembled.

FIG. 5 is a perspective view similar to FIG. 4 but showing the pieces assembled.

FIG. 6 is a perspective view similar to FIG. 5 but showing another example of an assembled air duct assembly.

FIG. 7 is a perspective view similar to FIGS. 5 and 6 but showing yet another example of an assembled air duct assembly.

DETAILED DESCRIPTION

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness. Additionally, several examples have been described throughout this specification. Any features from any example may be included with, a replacement for, or otherwise combined with other features from other examples.

Figure 1:
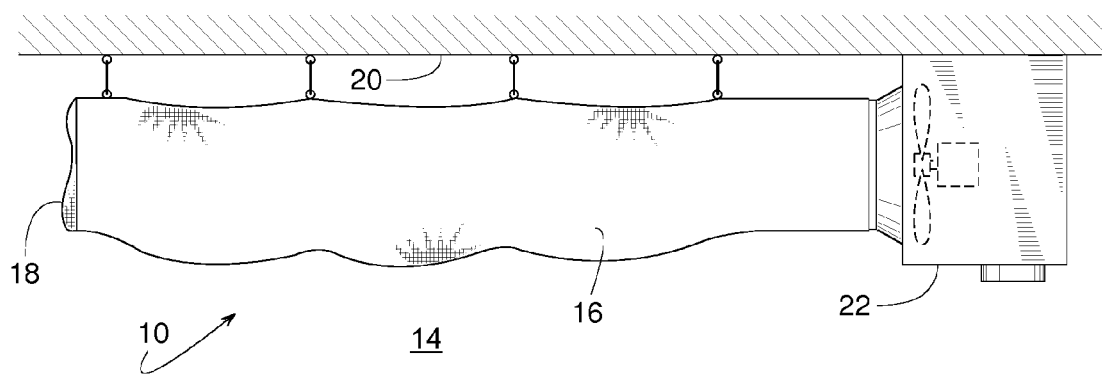
FIG. 1 is a side view of on example inflatable air duct assembly, wherein the duct is shown deflated.
Figure 2:
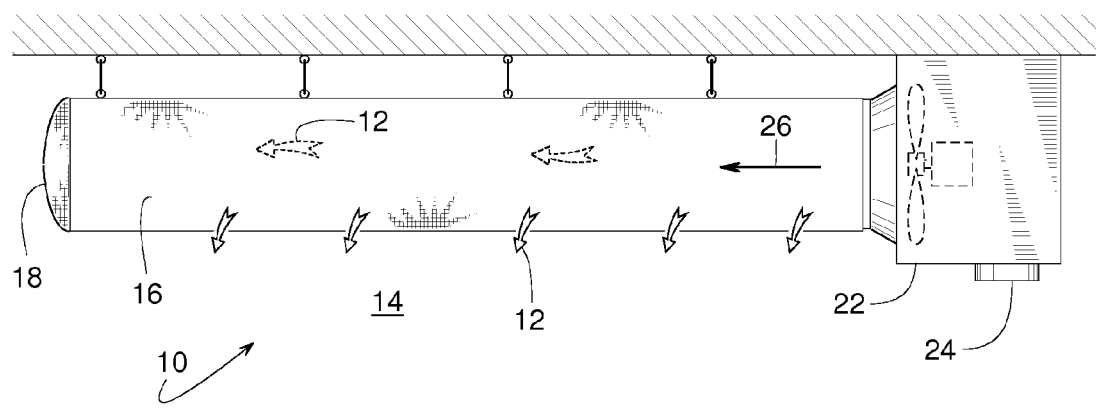
FIG. 2 is a side view of the air duct of FIG. 1 but showing the duct inflated.

FIGS. 1 and 2 show an example inflatable air duct or duct 10 set up for delivering air 12 to a comfort zone 14 or other area(s) of a building. In this example, duct 10 includes a pliable tubular sidewall or sidewall 16 with an end cap 18. While the duct 10 may be installed in numerous configurations and/or arrangements, in this example, duct 10 is suspended from an overhead support 20 (e.g., ceiling, rafter, beam, cable, etc.). An air supply, such as a blower 22, draws in air from an inlet 24 and discharges air 12 through the interior of duct 10, thereby inflating duct 10. The terms, "inflate," "inflating," "inflated," and "inflatable," as used herein, mean that upon pressurizing the interior of a duct, the duct 10 expands noticeably with the internal volume of the duct 10 increasing appreciably. This is the case even though some example inflatable ducts include structure that helps hold the duct in a partially expanded shape when the blower 22 is de-energized. FIG. 1 shows blower 22 de-energized with duct 10 deflated, and FIG. 2 shows blower 22 energized with duct 10 inflated.

When duct 10 is inflated, air 12 discharged from blower 22 flows longitudinally (in a direction generally indicated by arrow 26) through duct 10. Various examples of duct 10 releases air 12 from within duct 10 to comfort zone 14 via porosity and/or discrete openings in sidewall 16. Sidewall 16 may be made of one or more similar or different materials. For example, sidewall 16 may include and/or be made of materials including, but not limited to, urethane coated polyester fabric, uncoated polyester fabric, porous fabric, nonporous pliable sheet material, perforated pliable sheet material, and/or various combinations thereof.

Figure 3:
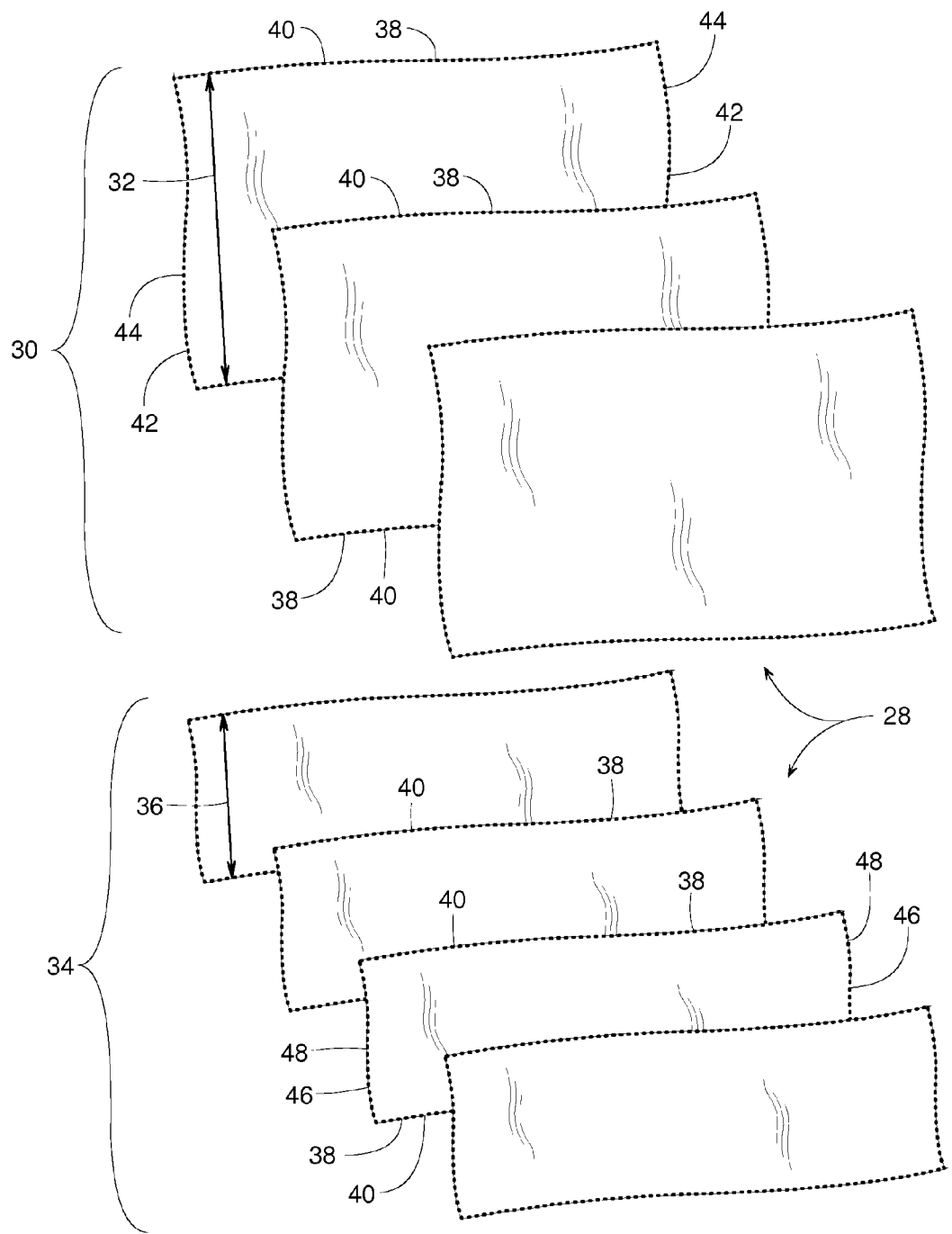
FIG. 3 is a front view of an example inventory of example stock sidewall pieces.

FIGS. 3-7 illustrate a method for creating inflatable air ducts (e.g., the air duct 10) for different installations without having to custom make unique pieces for each system. FIG. 3, for example, shows an inventory of a plurality of pliable sidewall pieces 28 including relatively large pieces 30 (e.g., larger circumferential length 32) and smaller pieces 34 (e.g., smaller circumferential length 36). In other examples, the inventories may have any number of sizes (e.g., 1, 2, 3, etc.) and/or shapes (square, rectangular, etc.) and some example inventories have only single-size pieces. In any case, the inventory of pieces can be assembled in different ways to create an assortment of inflatable duct tubes of various diameters and lengths For the example illustrated in FIG. 3, each piece 30 and 34 includes longitudinal edges 38 with disconnectable longitudinal joints 40 that may be interconnected to combine one or more pieces 30 and/or 34 to provide different tube diameters (e.g., a first diameter, a second diameter, a third diameter, etc.). Large pieces 30 have axial edges 42 with disconnectable circumferential joints 44, and smaller pieces 34 have axial edges 46 with disconnectable circumferential joints 48. Circumferential joints 44 and 48 may be interconnected to combine one or more pieces 30 and/or 34 to provide different tube lengths (e.g., a first length, a second length, a third length, etc.). The expression, "disconnectable joint," means a connection that can be repeatedly connected and separated multiple times without appreciable damage to the adjoining pieces over its expected useful life. Examples of joints 40, 44 and 48 include, but are not limited to, zippers, touch-and-hold fasteners (e.g., VELCRO, a registered trademark of Velcro Industries B.V.), bead-in-groove fasteners (e.g., ZIPLOC, a registered trademark of S.C. Johnson & Son, Inc.), series of hooks, series of buttons, series of snaps, laces, etc.

FIG. 4 shows one of the large pieces (e.g., a sidewall piece) 30 about to be connected to two smaller pieces (e.g., sidewall pieces) 34 and the resulting assembled tube segment 50 about to be connected to the axial end of another tube segment 52.

FIG. 5 shows the pieces 30 and 34 of FIG. 4 in their assembled configuration as tube segments 50 and 52. FIG. 6 shows two large pieces (e.g., sidewall pieces) 30 interconnected to provide a tube segment 54 with a diameter that is relatively smaller than the tube formed by pieces 30 and 34 of FIG. 5. FIG. 7 shows a single large piece (e.g., a single sidewall piece) 30 with its longitudinal edges 38 connected at a disconnectable joint 40 to provide an even smaller diameter tube segment 56. In examples where a tube is not perfectly cylindrical, the term, "diameter," refers to the effective diameter of the tube, which is defined herein as $(4A/3.14)^{0.5}$, wherein "A" is the cross-sectional area of the air passageway of the tube.

The example tube assemblies in FIGS. 5-7 are shown having a common sidewall piece (e.g., sidewall piece 30) to illustrate the universal application of the pieces as opposed to having to custom make each one. It should be noted that the inventory of pieces shown in FIG. 3 illustrates an example of providing a plurality of sidewall pieces. FIGS. 5-7 illustrate examples of suggesting a plurality of different design arrangements in which at least some of the plurality of sidewall pieces can be interconnected circumferentially to create an assortment of inflatable tubes of various diameters. The plurality of different design arrangements includes a larger diameter tube design (FIG. 5) that employs the common sidewall piece, and the plurality of different design arrangements includes a smaller diameter tube design (FIG. 6 or 7) that employs the common sidewall piece. A comparison of FIGS. 4 and 5 illustrates an example of assembling a chosen set of sidewall pieces from the plurality of sidewall pieces to create a certain inflatable tube (e.g., a tube having a particular diameter and/or flow characteristics).

Figure 8:
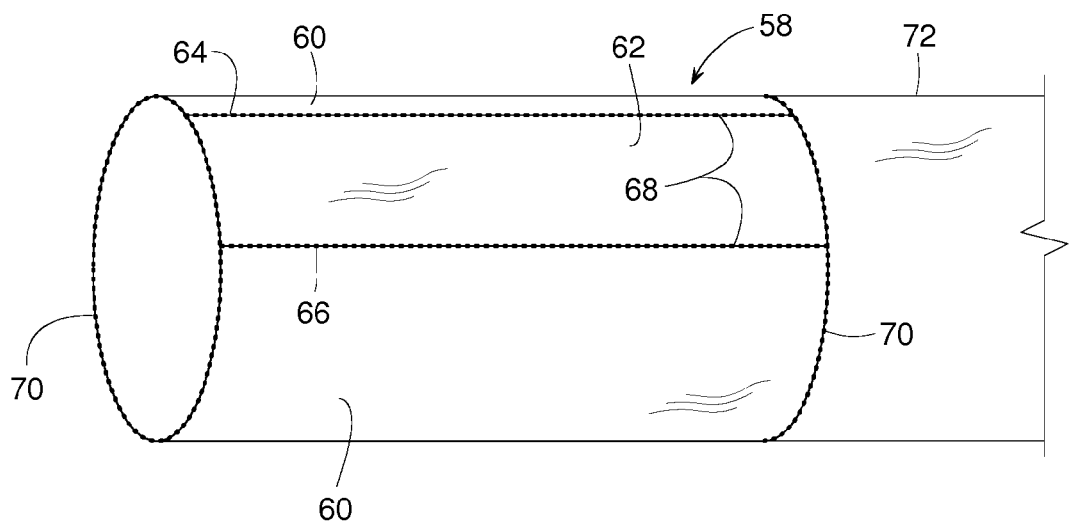
FIG. 8 is a perspective view of another example air duct assembly.
Figure 9:
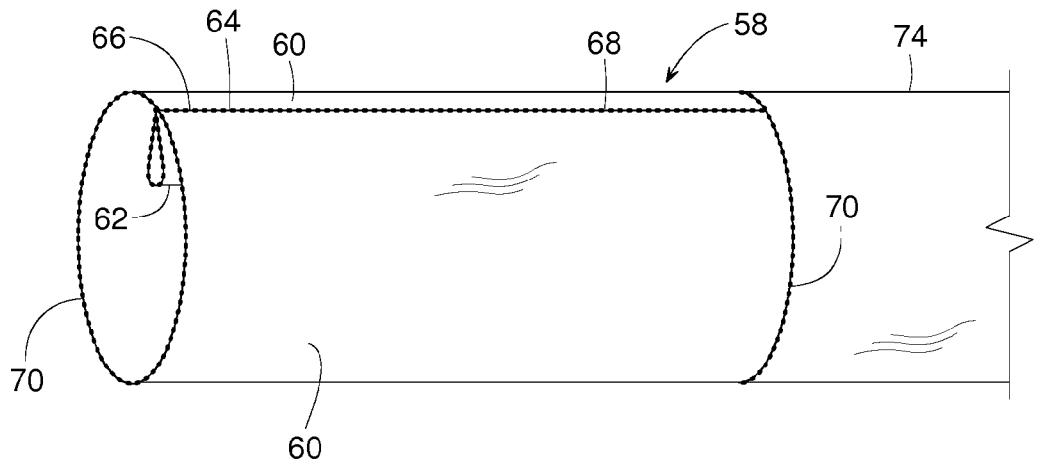
FIG. 9 is a perspective view similar to FIG. 8 but showing the duct in a smaller diameter configuration.

FIGS. 8 and 9 show an example inflatable air duct or duct 58 that can be selectively configured to a larger diameter configuration (FIG. 8) or a smaller diameter configuration (FIG. 9). The larger diameter configuration provides an expanded cross-sectional flow area, and the smaller diameter configuration provides a reduced cross-sectional flow area.

In this example, duct 58 includes a first pliable sidewall section 60 and a second pliable sidewall section 62. The two sections 60 and 62 are divided by a first longitudinal border 64 and a second longitudinal border 66. Duct 58 includes a disconnectable longitudinal joint 68 extending along borders 64 and 66. Examples of joint 68 include, but are not limited to, zippers, touch-and-hold fasteners (e.g., VELCRO), bead-in-groove fasteners (e.g., ZIPLOC), series of hooks, series of buttons, series of snaps, laces, etc. Disconnecting joint 68 to separate borders 64 and 66 places duct 58 in the larger diameter configuration, as shown in FIG. 8. Closing or connecting joint 68 brings borders 64 and 66 together and positions second sidewall 62 within the reduced cross-sectional flow area of duct 58, which places duct 58 in the smaller diameter configuration, as shown in FIG. 9. In either configuration, a circumferential joint 70 can connect duct 58 to the end of another appropriately sized tube segment, such as segment 72 or 74, for example.

Figure 10:
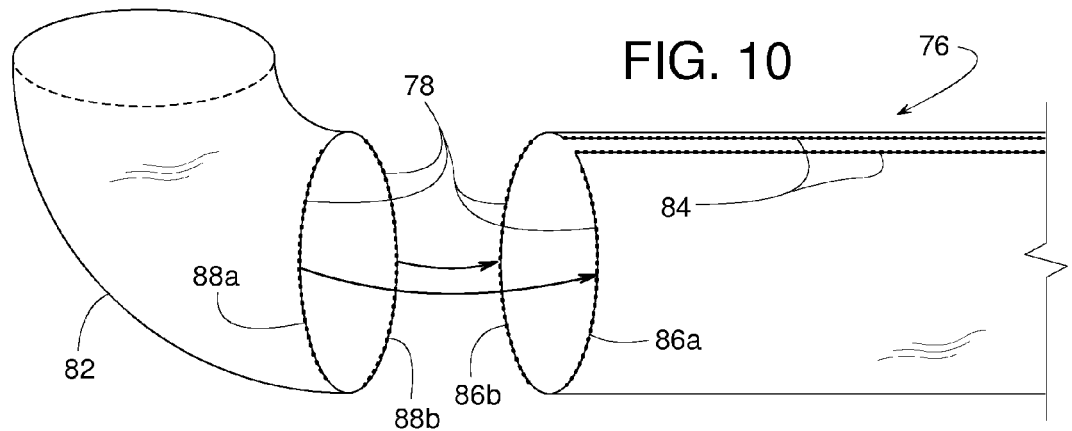
FIG. 10 is an exploded view showing an example air duct assembly with a configurable elbow.
Figure 11:
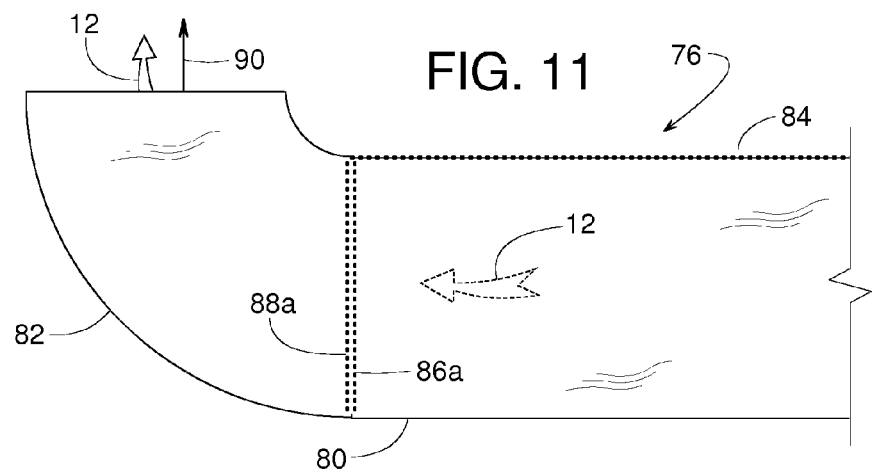
FIG. 11 is a perspective view of the duct of FIG. 10 but showing the duct assembled in an example configuration.
Figure 12:
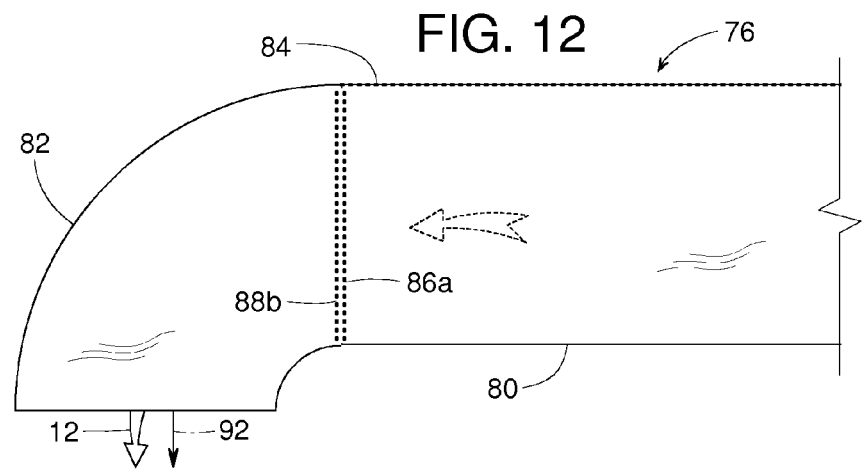
FIG. 12 is a perspective view of the duct of FIG. 10 but showing the duct assembled in another example configuration.

FIGS. 10, 11 and 12 show an example inflatable air duct assembly or duct assembly 76 that can be selectively configured to direct airflow in different directions. In this example, duct assembly 76 includes a disconnectable circumferential joint 78 that connects a pliable tube 80 to a pliable elbow 82 in multiple configurations. A longitudinal joint 84 connects the longitudinal edges of tube 80. Examples of joints 78 and 84 include, but are not limited to, zippers, touch-and-hold fasteners (e.g., VELCRO), bead-in-groove fasteners (e.g., ZIPLOC), series of hooks, series of buttons, series of snaps, laces, etc.

In the illustrated example, circumferential joint 78 includes a first tube joint segment 86a on tube 80, a second tube joint segment 86b on tube 80, a first elbow joint segment 88a on elbow 82, and a second elbow joint segment 88b on elbow 82. First tube joint segment 86a is selectively connectable to elbow joint segments 88a and 88b. Likewise, second tube joint segment 86b is selectively connectable to elbow joint segments 88a and 88b.

When first tube joint segment 86a and second tube joint segment 86b are connected respectively to first elbow joint segment 88a and second elbow joint segment 88b, as shown in FIG. 11, the inflatable air duct assembly 76 is in the first direction configuration to direct air 12 in a first direction 90. When first tube joint segment 86a and second tube joint segment 86b are connected respectively to second elbow joint segment 88b and first elbow joint segment 88a, as shown in FIG. 12, duct assembly 76 is in the second direction configuration to direct air 12 in a second direction 92. In some examples, directions 90 and 92 are in opposite directions, 180-degrees apart, which can be achieved by having joint segments 86a, 86b, 88a and 88b be of substantially equal circumferential length with longitudinal joint 84 being positioned circumferentially between tube joint segments 86a and 86b. However, the directions 90 and 92 may be arranged at any suitable angle relative to one another (e.g., 45-degrees apart, 90-degrees apart, etc.) and, accordingly, any number (e.g., 1, 2, 3, etc.) of joint segments 86 and 88 may be provided.

Figure 13:
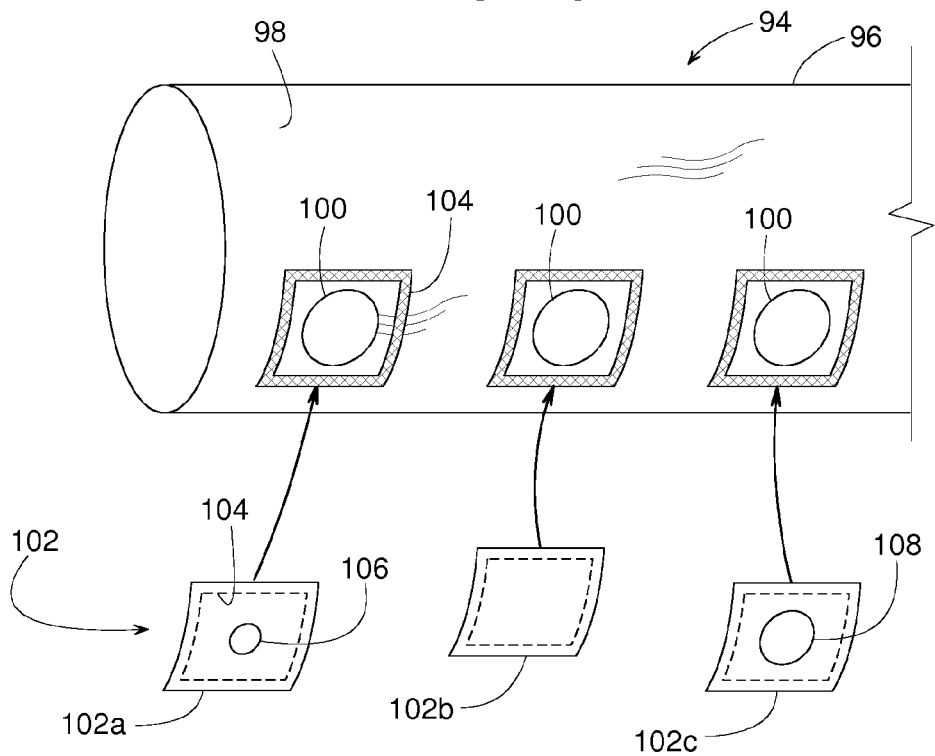
FIG. 13 is a perspective view of an example duct assembly with example removable pliable sheets about to be installed over discharge openings in the duct.
Figure 14:
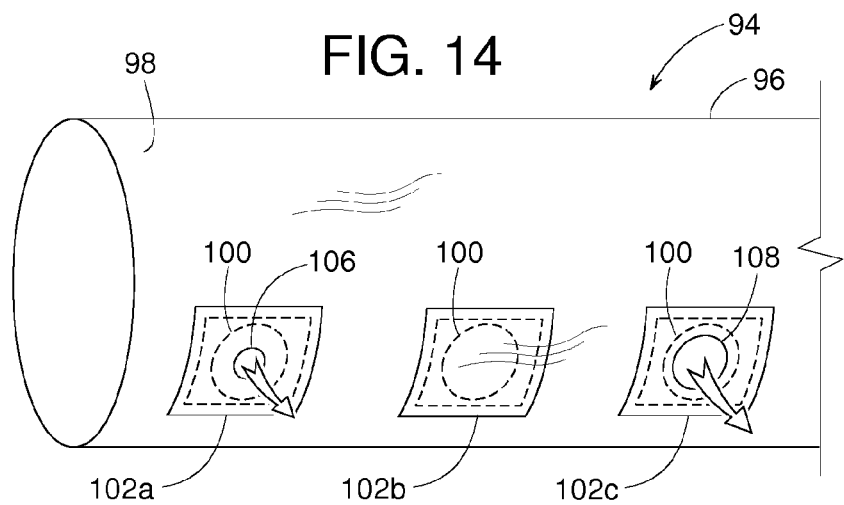
FIG. 14 is a perspective view similar to FIG. 13 but showing the pliable sheets installed.

FIGS. 13 and 14 show an example inflatable air duct assembly 94 that can be selectively configured to establish the volume of airflow discharged at various locations along the length of duct assembly 94. In this example, duct assembly 94 includes an inflatable tube 96 with a pliable sidewall 98 that includes a plurality of discharge openings 100. The discharge openings 100 may be similarly or differently sized. To restrict the airflow discharged through openings 100, a pliable sheet or patch 102 is placed over one or more openings 100. The example sheets 102 may define an opening though which air may flow that may be differently sized than opening 100. Alternatively, sheets 102 may not define an opening. The openings of sheet 102 may be similarly or differently sized (e.g., a first size, a second size, etc.) and/or shaped (e.g., a first shape, a second shape, etc.). Any suitable fastener 104 (e.g., touch-and-hold fastener) can be used to help hold sheet 102 to sidewall 98. In other examples, sheet 102 may additionally or alternatively be secured to sidewall 98 using an adhesive or glue. In the illustrated examples, a sheet 102a has a relatively small opening 106 for greatly restricting the airflow through opening 100 when sheet 102a is moved from its more-open position (FIG. 13) to its obstructed position (FIG. 14). A sheet 102b has no opening, so sheet 102b completely blocks airflow through opening 100 when sheet 102b is moved from its more-open position (FIG. 13) to its obstructed position (FIG. 14) (e.g., when sheet 102b is affixed to sidewall 98 via fastener 104). A sheet 102c has a moderately sized opening 108 for providing some flow resistance through opening 100 when sheet 102c is moved from its more-open position (FIG. 13) to its obstructed position (FIG. 14).

Figure 15:
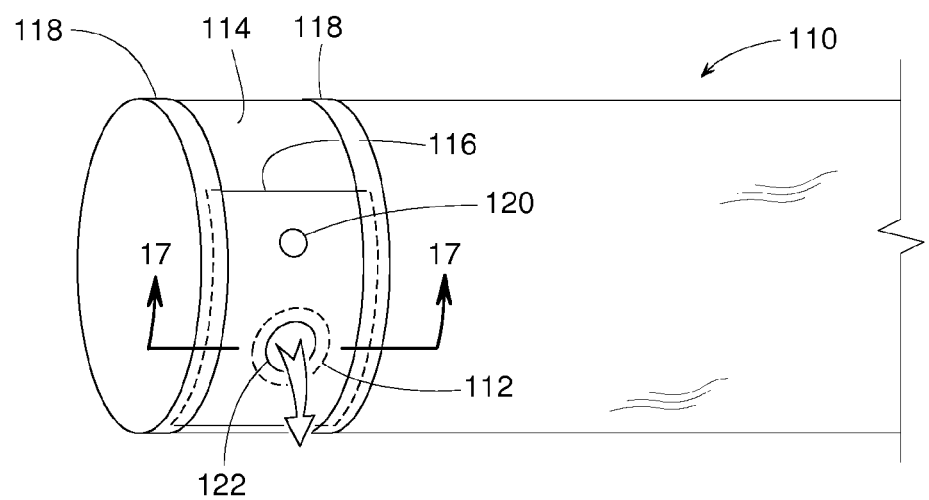
FIG. 15 is a perspective view of another example duct assembly with a circumferentially movable sheet for adjusting the airflow through a discharge opening in the duct.
Figure 16:
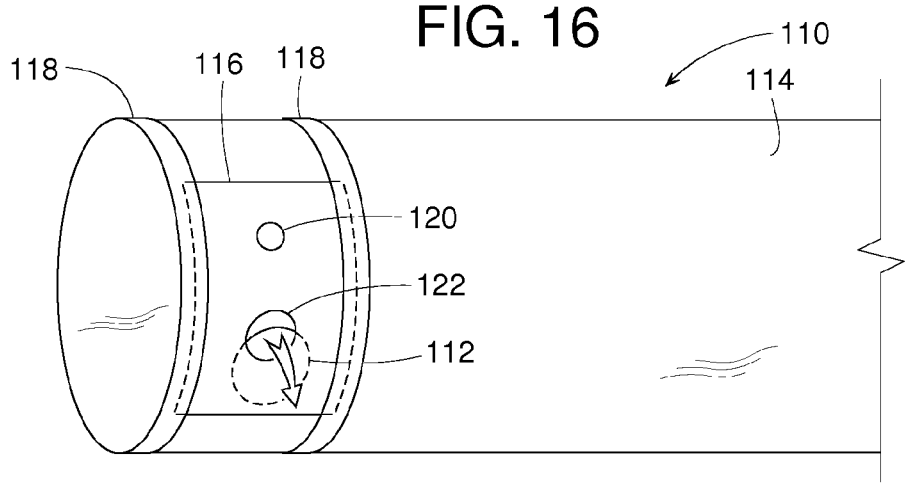
FIG. 16 is a perspective view similar to FIG. 15 but showing the example movable sheet in another position.
Figure 17:
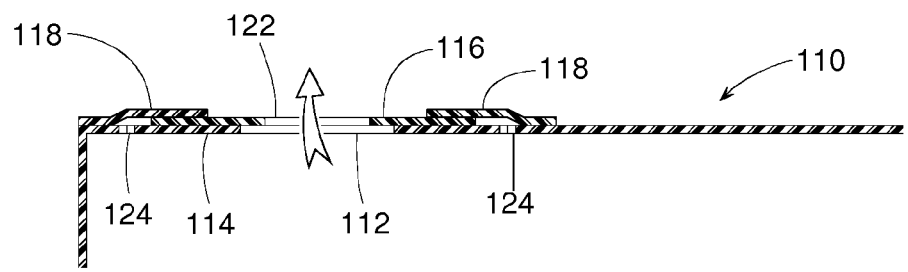
FIG. 17 is a cross-sectional view taken along line 17-17 of FIG. 15.

FIGS. 15, 16 and 17 show an example inflatable air duct assembly 110 that can be selectively configured to establish or change the volume of airflow discharged through an opening 112 in a pliable sidewall 114 of duct assembly 110. The duct assembly 110 may include one or more pliable pieces that are coupled together. To restrict the airflow discharged through opening 112, a pliable sheet 116 is attached to sidewall 114 such that sheet 116 can be moved circumferentially around duct assembly 110 to adjust the extent to which sheet 116 covers opening 112. In some examples, the sheet 116 may be additionally secured relative to the sidewall 114 with a fastener such as a touch-and-hold fastener. FIG. 15 shows sheet 116 in a more-open position, and FIG. 16 shows sheet 116 is an obstructed position. In the illustrated example, duct assembly 110 includes a pair of axially spaced-apart circumferential lips, or fasteners 118 that at least partially holds sheet 116 against sidewall 114. For example, opposing portions of sheet 116 may be at least partially positioned within a groove, channel or slot defined by the lips 118 and the sidewall 114 (e.g., similar to a tongue-and-groove) such that the interaction between sheet 116 and lips 118 and sidewall 114 holds sheet 116 relatively securely against sidewall 114 while enabling sheet 116 to be moveable (e.g., circumferentially moveable) relative to sidewall 114. Lips 118 may be made of a similar or different material as sidewall 114 and/or sheet 116. For example, lips 118 may be made at least partially of a relatively rigid material to ensure that sheet 116 maintains its position adjacent to sidewall 114. In some examples, lips 118 may have a similar or different thickness as sidewall 114 and/or sheet 116. In some examples, edges of sheet 116 may be made of a different material than the remainder of sheet 116 and/or include an insert(s) adjacent to the edges to increase the rigidity of edges and substantially ensure that sheet 116 maintains its position adjacent to sidewall 114 and lip 118. In some examples, lips 118 can be coupled to sidewall 114 by sewing, glue or adhesive, touch-and-hold fasteners, etc.

To control the volume of airflow, in this example, sheet 116 includes a relatively small opening 120 and a moderately-sized opening 122, either of which can be move in or out of registry with opening 112 in sidewall 114, thereby determining the flow restriction therethrough. In some examples, lips 118 also provide a cover for circumferential joints 124 (e.g., a zipper).

Figure 18:
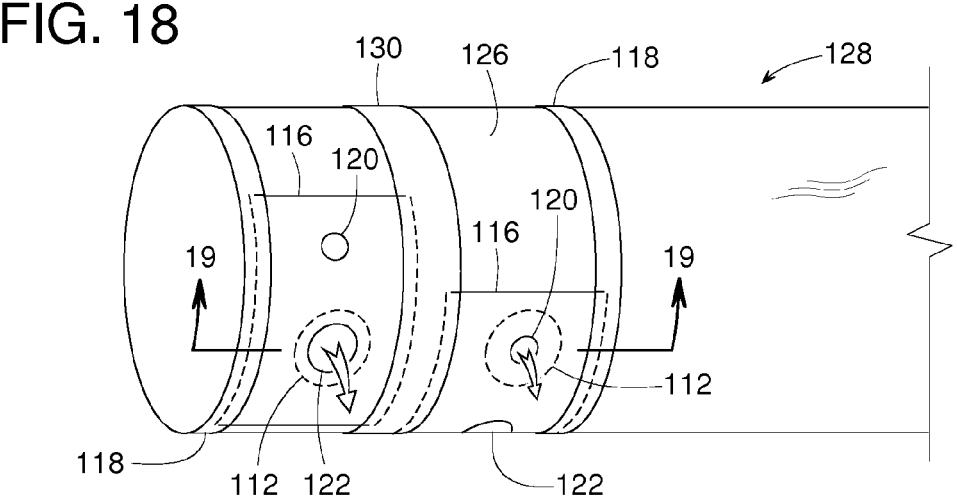
FIG. 18 is a perspective view of another example duct assembly with two circumferentially movable sheets for adjusting the airflow through two discharge openings in the duct.
Figure 19:
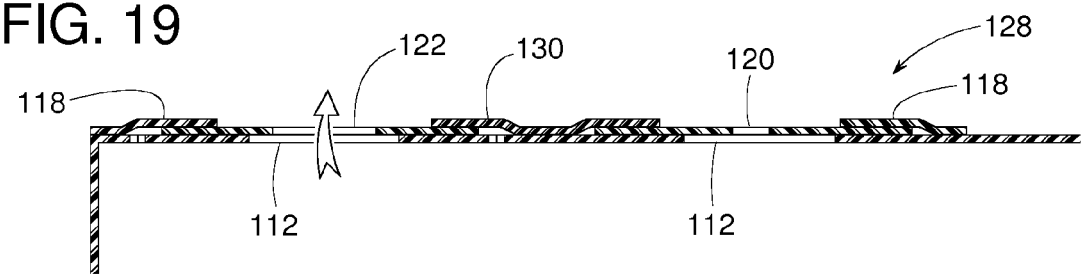
FIG. 19 is a cross-sectional view taken along line 19-19 of FIG. 18.

FIGS. 18 and 19 show an example of how the examples illustrated in FIGS. 15-17 can be expanded to include multiple pliable sheets 116 for adjustably covering multiple discharge openings 112 in a pliable sidewall 126 of a duct 128. The duct 128 may include one or more pliable pieces that are coupled together. In this example, to hold two sheets 116 in position, an intermediate circumferential lip or fastener 130 is installed between lips 118. In some examples, the sheets 116 may additionally be secured relative to the duct 128 with a fastener such as a touch-and-hold fastener.

Figure 20:
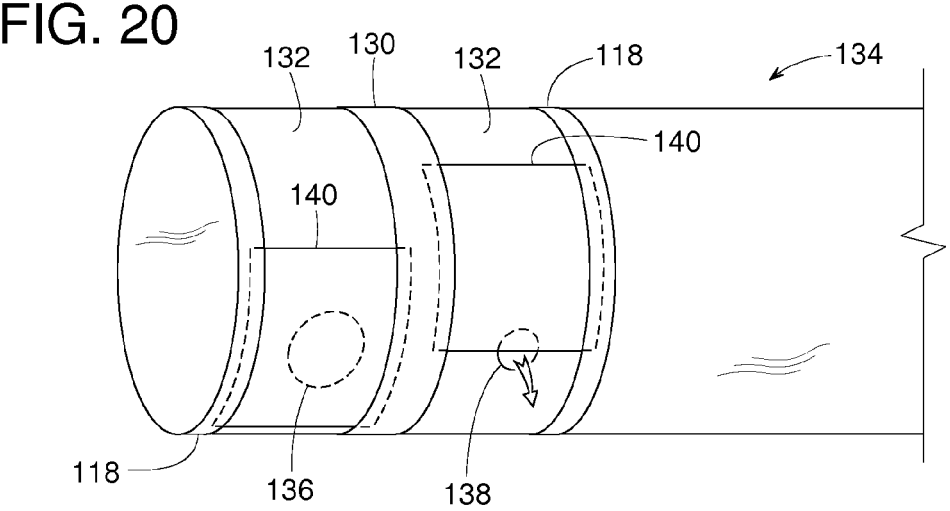
FIG. 20 is a perspective view of another example duct assembly with two circumferentially movable sheets for adjusting the airflow through two discharge openings in the duct.

FIG. 20 is an example similar to that of FIGS. 18 and 19; however, a pliable sidewall 132 of an inflatable duct 134 includes a relatively large discharge opening 136 and a relatively small discharge opening 138. The duct 134 may include one or more pliable pieces that are coupled together. The volume of air flowing through openings 136 and 138 is controlled by adjusting the extent to which pliable sheets 140 cover openings 136 and 138. One sheet 140 is shown completely covering opening 136, and the other sheet 140 only partially covers opening 138.

Figure 21:
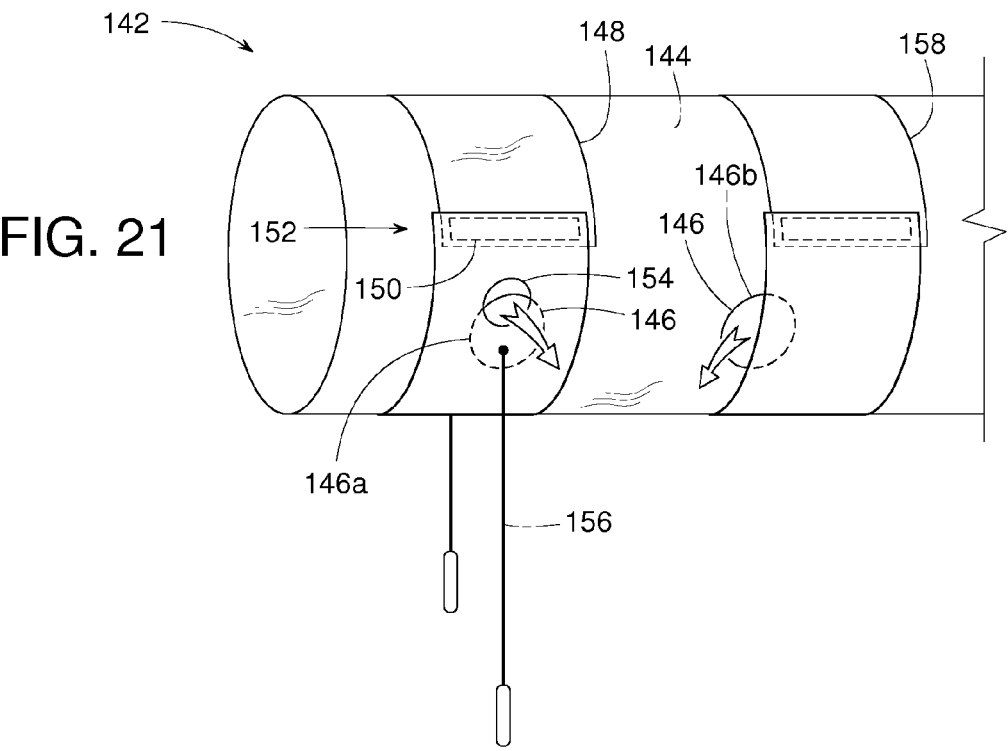
FIG. 21 is a perspective view of another example duct assembly with two movable sheets for adjusting the airflow through two discharge openings in the duct.

An example inflatable air duct 142, shown in FIG. 21, includes a pliable sidewall 144 with one or more discharge openings 146 with airflow therethrough being adjustable by way of a movable pliable sheet in the form of a band that encircles duct 142. A sheet 148, for example, is a band created by a fastener 150 connecting opposite ends 152 of the band together. Examples of fastener 150 include, but are not limited to, a zipper, a touch-and-hold fastener (e.g., VELCRO), a bead-in-groove fastener (e.g., ZIPLOC), a series of hooks, a series of buttons, a series of snaps, laces, etc. The duct 142 may include one or more pliable pieces that are coupled together. Sheet 148, in this example, includes an opening 154 that can be moved in or out of registry with opening 146a by adjustably rotating sheet 148 around or relative to duct 142. In some examples, the sheet 148 may additionally be secured relative to the duct 142 with a fastener such as a touch-and-hold fastener. The openings 146a and 154 may be similarly or differently sized. In some examples, an elongate member 156 (e.g., string, cable, chain, strap, cord, rod, etc.) attached to sheet 148 facilitates the positional adjustment of sheet 148.

Additionally or alternatively, a sheet 158 similar to sheet 148 but without opening 154 is used in some examples to control the airflow through opening 146b by adjusting the position of sheet 158 along the length of duct 142. FIG. 21, for example, shows sheet 158 partially covering opening 146b to restrict the airflow therethrough.

Figure 22:
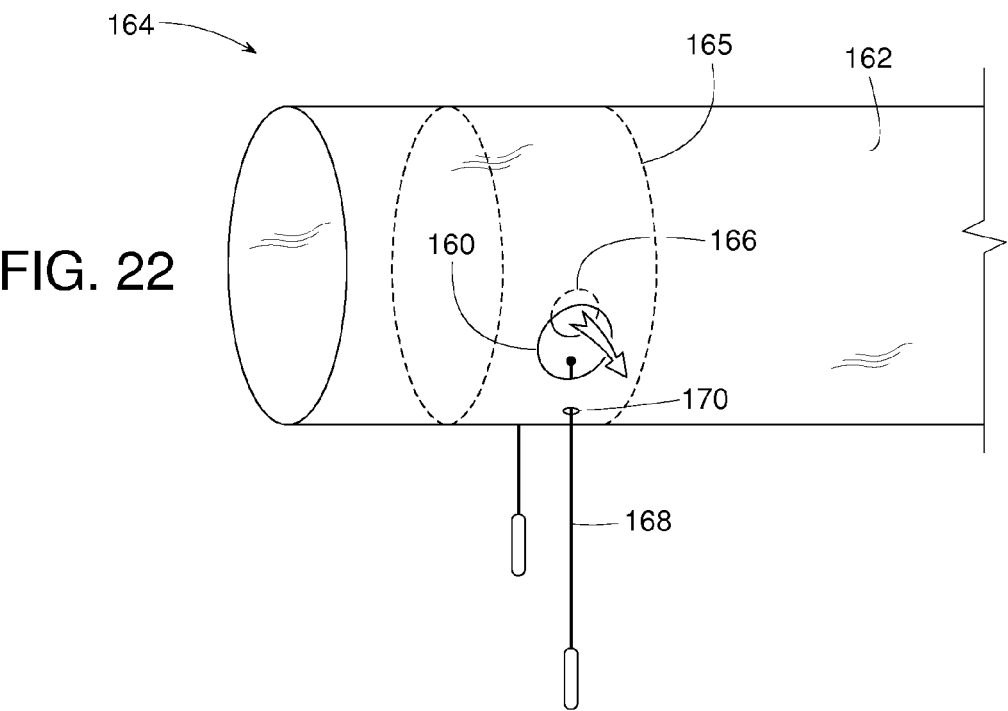
FIG. 22 is a perspective view of an example duct assembly with an internal movable sheet for adjusting the airflow through a discharge opening in the duct.

In some examples, as shown in FIG. 22, airflow through a discharge opening 160 in a pliable sidewall 162 of an inflatable duct 164 is controlled by the position of a band-like sheet 165. The sheet 165 may be installed inside of duct 164, against and/or adjacent to an inner surface of duct 164 (terms "tube" and "duct" being used interchangeably herein). In this example, sheet 165 includes an opening 166 that can be moved in or out of registry with opening 160 by adjustably rotating sheet 165 within duct 164. The openings 160 and 166 may be similarly or differently sized. An elongate member 168 (e.g., string, cable, chain, strap, cord, rod, etc.) threaded or extending through a small hole or aperture 170 in sidewall 162 and connected to sheet 165 can facilitate the circumferential adjustment of sheet 165. The duct 164 may include one or more pliable pieces that are coupled together.

Figure 23:
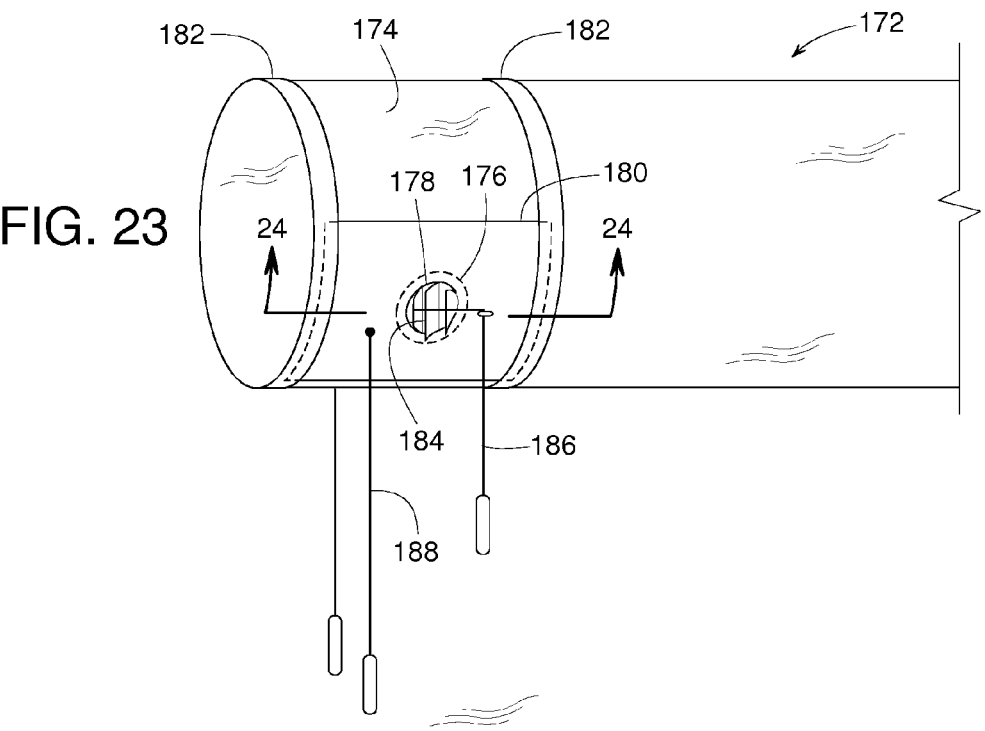
FIG. 23 is a perspective view of an example air duct assembly that includes a movable sheet with example flexible louvers for adjusting the airflow through a discharge opening in the duct.
Figure 24:
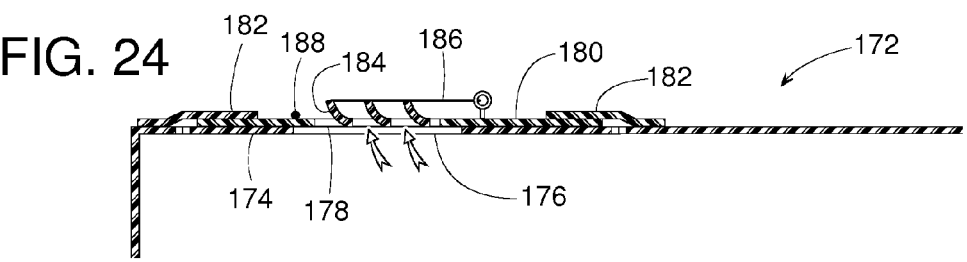
FIG. 24 is a cross-sectional view taken along line 24-24 of FIG. 23.

FIGS. 23 and 24 show an example duct assembly 172 similar to that of FIGS. 15-17 in that a pliable sidewall 174 includes a discharge opening 176 through which airflow is controlled by the degree of registry that opening 176 has with an opening 178 in an overlying and/or adjacent to pliable sheet 180. In this example, duct assembly 172 includes a pair of circumferential lips or fasteners 182 that help hold sheet 180 in a selected position. The adjustable circumferential position of sheet 180 around duct assembly 172 determines the registry of openings 176 and 178.

In the example of FIGS. 23 and 24, one or more flexible flaps 184 (louvers) extend at least partially across opening 178 of sheet 180. In some examples, an elongate member 186 (e.g., string, cable, chain, strap, cord, rod, etc.) coupled to flap 184 serves as an actuator (controlled manually or otherwise) that deflects flap 184 to adjustably direct airflow through opening 178. Additionally or alternatively, while elongate member 186 controls the direction of airflow, another elongate member 188 connected to sheet 180 adjusts the circumferential position of sheet 180 to control the volume of air discharged through openings 176 and 178.

Figure 25:
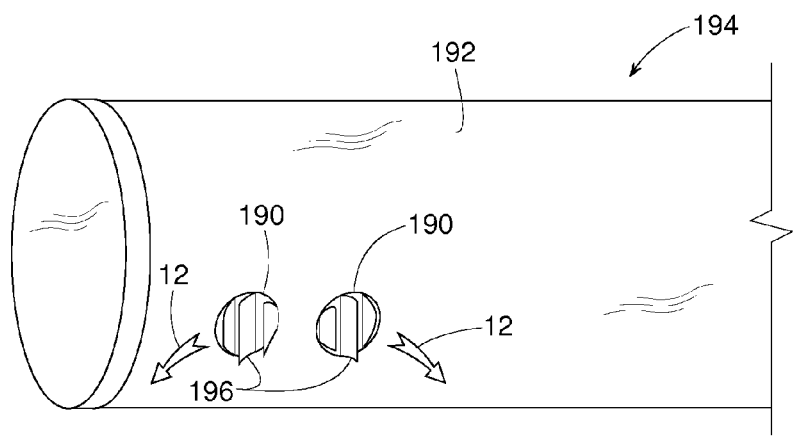
FIG. 25 is a perspective view of an example inflatable air duct with integrally formed discharge louvers.

In some examples, as shown in FIG. 25, louvered discharge openings 190 are cut directly into a pliable sidewall 192 of an example duct 194. In this example, one or more flaps 196 (resiliently flexible louvers) are a seamless integral extension of sidewall 192, and the flexibility of the sidewall material causes flaps 196 to deflect in response to the air pressure within duct 194. Thus, both the direction and volume of discharge air is adjustable by adjusting the air pressure within duct 194. In other examples, one or more flaps 196 may be coupled to sidewall 192 adjacent to opening 190. In such examples, one or more flaps 196 may be coupled adjacent to opening 190 in a manner that controls and/or directs the flow of air through opening 190. Moreover, in some examples, two relatively adjacent discharge openings 190 have flaps 196 that direct air 12 in two different directions, generally away from each other, to more broadly disperse discharge air 12 into the comfort zone.

Figure 26:
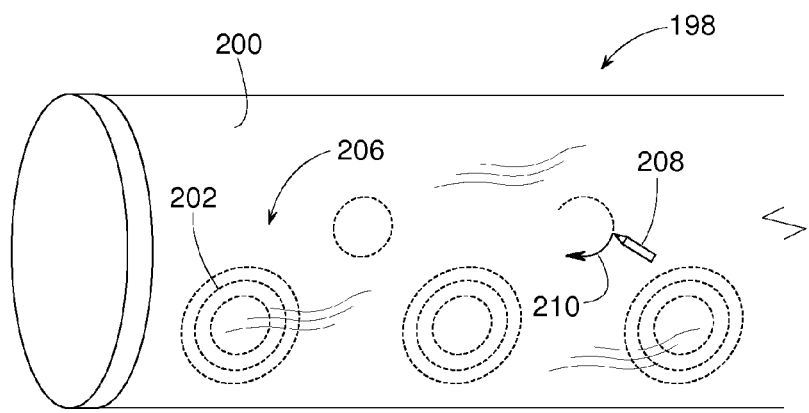
FIG. 26 is a perspective view of an example inflatable air duct with a plurality of example cutout patterns.
Figure 27:
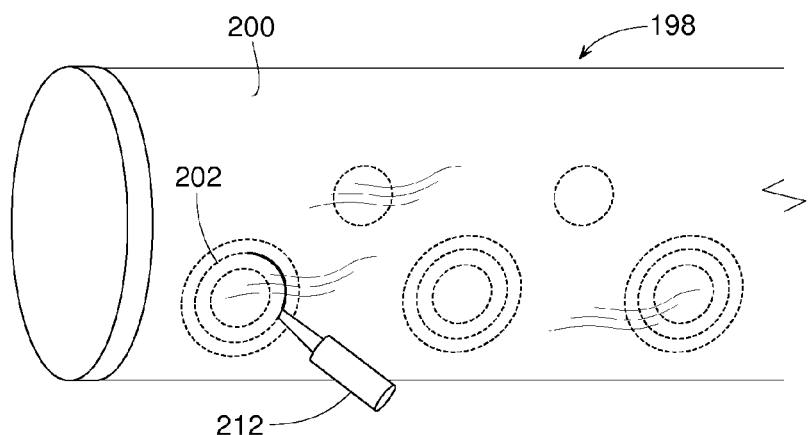
FIG. 27 is a perspective view similar to FIG. 26 but showing the cutout pattern being used as a guide for creating a discharge opening.
Figure 28:
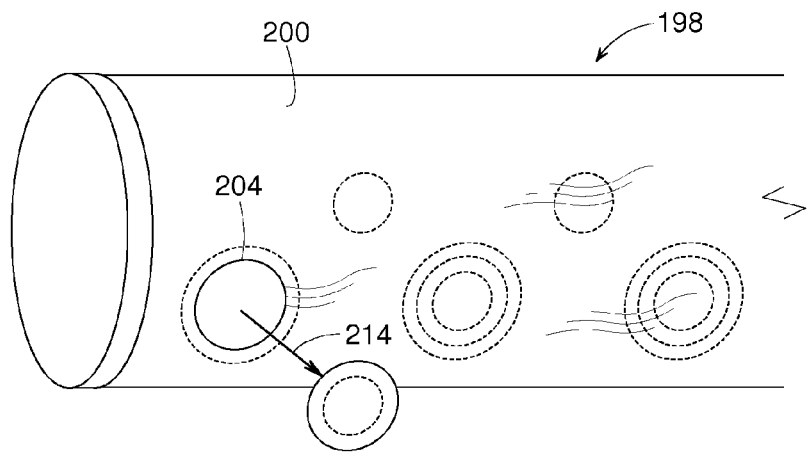
FIG. 28 is a perspective view similar to FIGS. 25 and 26 but showing a cutout being removed to produce the discharge opening.

FIGS. 26-28 illustrate an example inflatable air duct 198 comprising a pliable tubular sidewall 200 with a cutout pattern 202 thereon. The duct 198 may include one or more pieces coupled together. Cutout pattern 202 provides guidance for creating a certain size and shape discharge opening 204 (FIG. 28) through sidewall 200 at a predetermined location. The term, "cutout," as used herein means removable by any means, examples of which include, but are not limited to, cutting, tearing, breaking, etc. Examples of cutout pattern 202 include, but are not limited to, a printed ink image, a perforated line, a laser burned line, etc. Some examples of duct 198 include a plurality of cutout patterns distributed across duct 198. In some examples, a plurality of multiple-size cutout patterns 206 are at the same general location on duct 198. Alternatively, the cutout patterns 206 may be differently arranged along the duct 198. The cutout patterns 206 may be similar or different from one another and may have any suitable shape (e.g., circular, oval, square, etc.) or size, for example.

A marker 208 and an arrow 210 in FIG. 26 illustrate marking a cutout pattern on a pliable tubular sidewall. A knife or tool 212 in FIG. 27 and an arrow 214 in FIG. 28 illustrate creating a discharge opening through the pliable tubular sidewall at the cutout pattern.

In order to facilitate ordering and/or selecting inflatable tube assemblies, a webpage or other user interface may be provided. For example, a webpage provided on the Internet may enable customers to enter design parameters (e.g., building dimensions, ceiling heights, room dimensions, airflow requirements, etc.) and receive an indication identifying one or more inflatable air duct designs that meet the design parameters. The customer may then select from among the various potential air duct designs, or change the parameters to get a different set of potential air ducts. Once the customer selects the desired set of air ducts (e.g., by making a selection with a mouse or other user input device), the selected air ducts are identified to the manufacturer who can then process the order by assembling and shipping the desired inflatable air ducts using the inventory of sidewall pieces. Of course, payment information (e.g., credit card information, user identification information such as name and address, etc.) may be obtained when accepting the order.

Additionally or alternatively, the above website could be used by a salesperson of the manufacturer, a distributor or other middleman to assist in soliciting, building or otherwise obtaining sales. Also, although the above is described in the context of the Internet, the user interface could be implemented by locally executing software rather than (or addition to) being hosted on the Internet.

Figure 29:
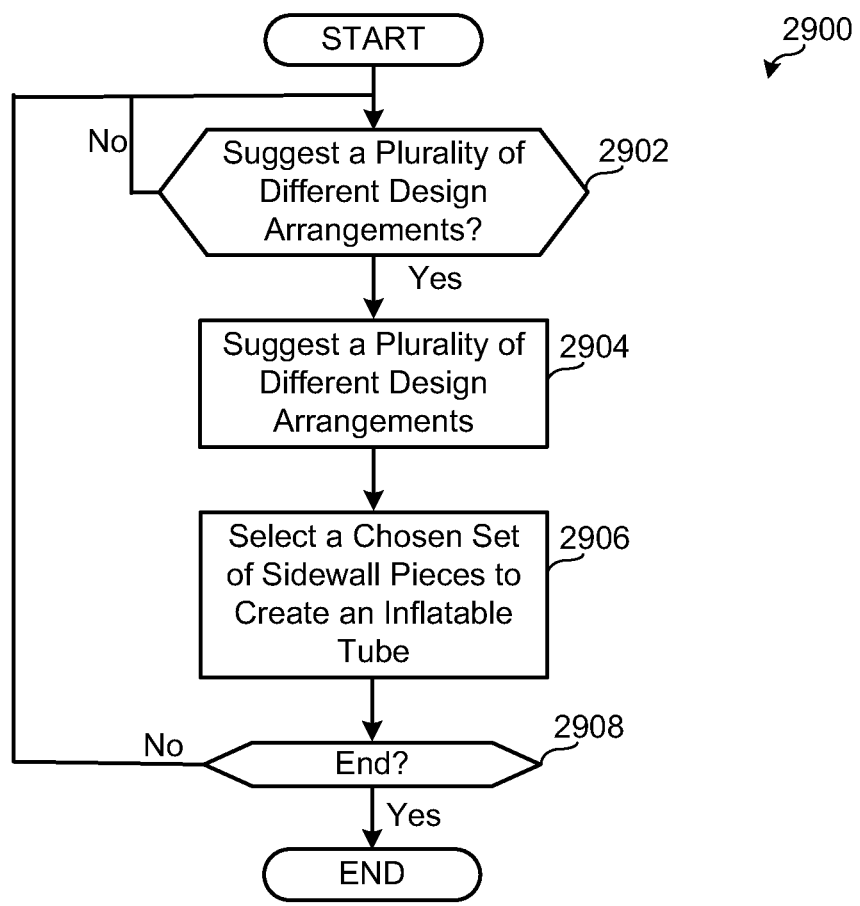
FIG. 29 is a flow diagram representative of example machine readable instructions that may be executed to develop an inflatable air duct assembly.

FIG. 29 is a flow diagram representing example machine readable instructions 2900 that may be executed to identify and/or select inflatable air duct assemblies meeting certain design parameters. The machine readable instructions of FIG. 29 may be executed using a processor, a controller and/or any other suitable processing device. For example, the example instructions of FIG. 29 may be implemented using coded instructions (e.g., computer readable instructions) stored on a tangible computer readable medium such as a flash memory, a read-only memory (ROM), and/or a random-access memory (RAM). As used herein, the term tangible computer readable medium is expressly defined to include any type of computer readable storage and to exclude propagating signals. Additionally or alternatively, the example instructions of FIG. 29 may be implemented using coded instructions (e.g., computer readable instructions) stored on a non-transitory computer readable medium such as a flash memory, a read-only memory (ROM), a random-access memory (RAM), a cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Alternatively, some or all of the example processes of FIG. 29 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example processes of FIG. 29 may be implemented manually or as any combination(s) of any of the foregoing techniques, for example, any combination of firmware, software, discrete logic and/or hardware. Further, although the example processes of FIG. 29 are described with reference to the flow diagrams of FIG. 29, other methods of implementing the processes of FIG. 29 may be employed. For example, the order of execution of the blocks may be changed, and/or some of the blocks described may be changed, eliminated, sub-divided, or combined. Additionally, any or all of the example processes of FIG. 29 may be performed sequentially and/or in parallel by, for example, separate processing threads, processors, devices, discrete logic, circuits, etc.

Referring to FIG. 29, at block 2902, a user enters design parameters indicative of the environment in which the air ducts are to perform. These parameters may include desired air flows, room dimensions, ceiling heights, etc. Once the parameters are received (block 2902), the instructions identify one or more inflatable air duct designs that meet the design parameters input by the user (block 2904). Preferably, the suggestions are displayed to the user, for example, via a computer display. The suggested air duct design(s) may include a plurality of sidewall pieces that can be interconnected circumferentially to create an assortment of inflatable tubes meeting the air flow requirements for the environment of use specified by the design parameters. The instructions of FIG. 29, then await a user selection of one of the suggested designs or entry of different design parameters (e.g., selection of a start over icon) (block 2905). When a user selects one of the design suggestions (block 2905), the instructions of FIG. 29 identify a set of sidewall pieces required to assemble the inflatable air duct(s) identified by the user selection (block 2906). The identification of the sidewall pieces may then be compiled in a job order or other list and forwarded to a manufacturing site. The identified inflatable air ducts are then assembled at the manufacturing site and/or the pieces are forwarded to the job site for on-site assembly (block 2907). At 2908, the instructions determine whether or not another project is to be processed. If so, control returns to block 2902. If not, the instructions of FIG. 29 terminate.

Figure 30:
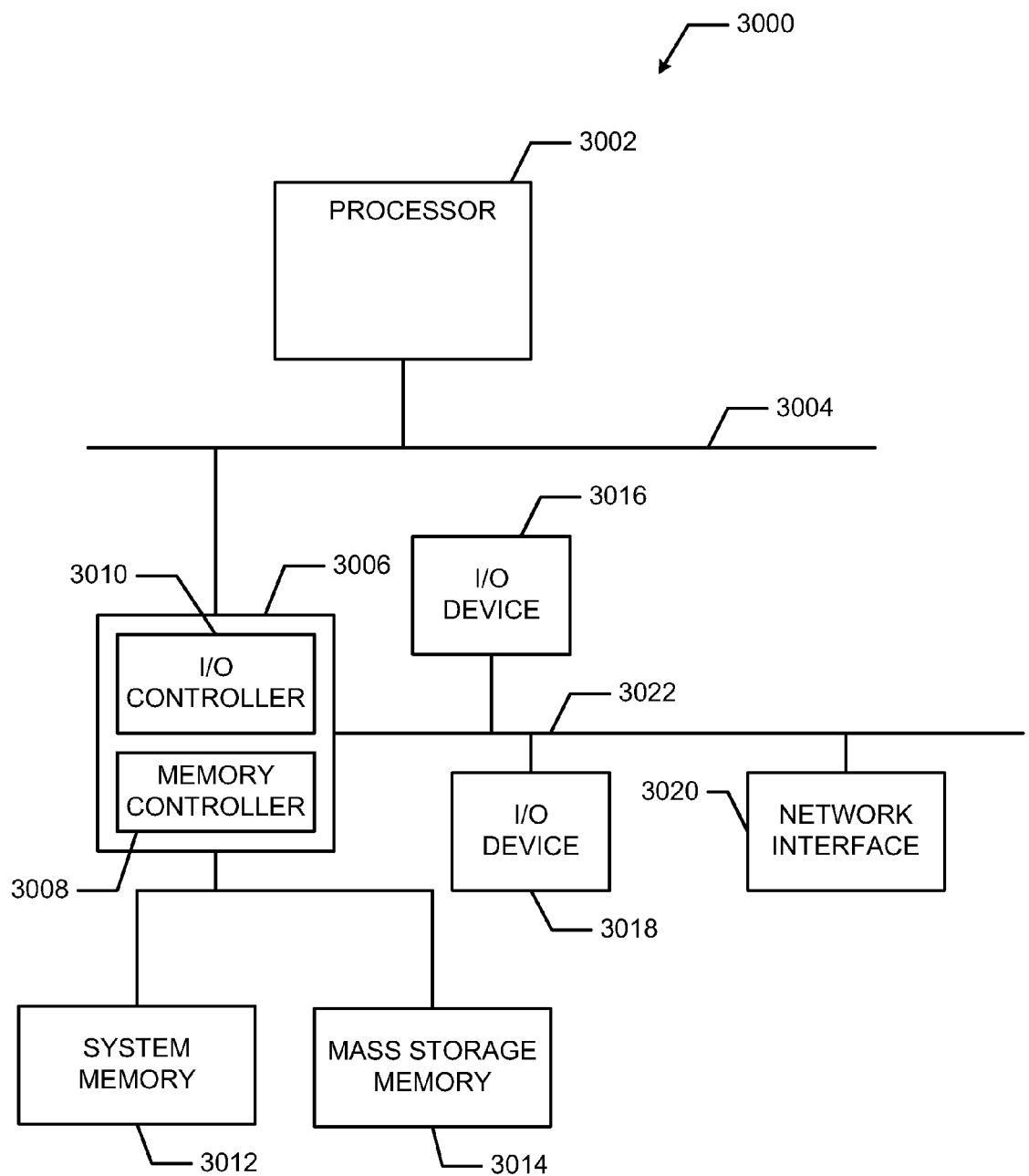
FIG. 30 is a schematic illustration of an example processor platform that may be used and/or programmed to execute the example instructions of FIG. 29 to implement a system to develop inflatable air duct assemblies and/or orders for inflatable air duct assemblies.

FIG. 30 is a block diagram of an example processor system 3000 that may be used to execute the instructions of FIG. 29. As shown in FIG. 30, the processor system 3000 includes a processor 3002 that is coupled to an interconnection bus 3004. The processor 3002 may be any suitable processor, processing unit or microprocessor. Although not shown in FIG. 30, the system 3000 may be a multi-processor system and, thus, may include one or more additional processors that are identical or similar to the processor 3002 and that are communicatively coupled to the interconnection bus 3004.

The processor 3002 of FIG. 30 is coupled to a chipset 3006, which includes a memory controller 3008 and an input/output (I/O) controller 3010. A chipset typically provides I/O and memory management functions as well as a plurality of general purpose and/or special purpose registers, timers, etc. that are accessible or used by one or more processors coupled to the chipset 3006. The memory controller 3008 performs functions that enable the processor 3002 (or processors if there are multiple processors) to access a system memory 3012 and a mass storage memory 3014.

The system memory 3012 may include any desired type of volatile and/or non-volatile memory such as, for example, static random access memory (SRAM), dynamic random access memory (DRAM), flash memory, read-only memory (ROM), etc. The mass storage memory 3014 may include any desired type of mass storage device including hard disk drives, optical drives, tape storage devices, etc. The instructions of FIG. 29 may be stored in the system memory 3012.

The I/O controller 3010 performs functions that enable the processor 3002 to communicate with peripheral input/output (I/O) devices 3016 and 3018 and a network interface 3020 via an I/O bus 3022. The I/O devices 3016 and 3018 may be any desired type of I/O device such as, for example, a keyboard, a video display or monitor, a mouse, etc. The network interface 3020 may be, for example, an Ethernet device, an asynchronous transfer mode (ATM) device, an 802.11 device, a DSL modem, a cable modem, a cellular modem, etc. that enables the processor system 3000 to communicate with another processor system.

While the memory controller 3008 and the I/O controller 3010 are depicted in FIG. 30 as separate blocks within the chipset 3006, the functions performed by these blocks may be integrated within a single semiconductor circuit or may be implemented using two or more separate integrated circuits. The system of FIG. 30 may represent, for example, a server executing the instructions of FIG. 29 in response to HTTP requests received over the Internet. The server may serve one or more webpages to requesting clients in order to solicit the design parameters, display air duct design suggestions and/or receive user selections of one or more of the suggested designs. Additionally, the server may receive payment information and/or authorization from a user and/or interact with a third party payment server to process payments associated with orders for air ducts.

Figure 31:
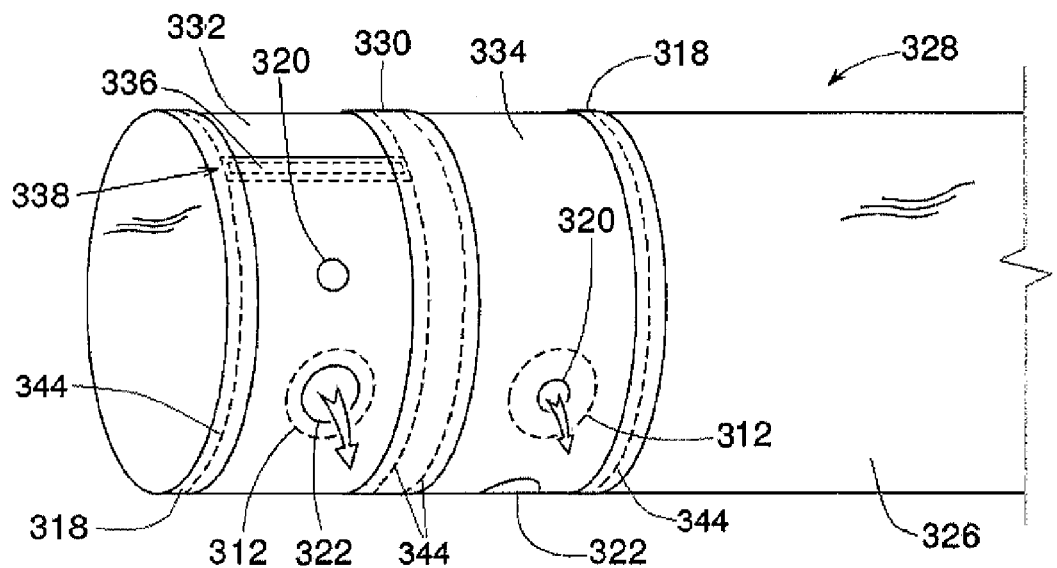
FIG. 31 is a perspective view of another example duct assembly with two movable sheets for adjusting the airflow through two discharge openings in the duct.

FIG. 31 shows an example duct assembly similar to that of FIGS. 18 and 19, wherein the example air duct assembly can be selectively configured to establish or change the volume of airflow discharged through openings 312. To restrict the airflow discharged through openings 312, pliable sheets 332 and 334 are attached to pliable sidewall 326 of a duct 328 such that sheets 332 and 334 can be moved circumferentially around duct 328 to adjust the extent to which sheets 332 and 334 cover openings 312. Duct 328 includes axially spaced-apart circumferential lips or fasteners 318 and intermediate circumferential lip or fastener 330 installed between lips 318 to at least partially hold sheets 332 and 334 against sidewall 326. Opposing portions of sheets 332 and 334 may at least partially be positioned within a groove, channel, or slot defined by lips 318 and 330 and sidewall 326 (e.g., similar to a tongue-and-groove joint) such that the interaction between sheets 332 and 334 and lips 318 and 330 holds sheets 332 and 334 relatively securely against sidewall 326 while enabling sheets 332 and 334 to be moveable (e.g., circumferentially moveable) relative to sidewall 326. In some examples, a releasable connector (e.g., touch-and-hold fasteners, buttons, snaps, zippers, etc.) may also be provided to secure sheets 332 and 334 to sidewall once sheets 332 and 334 have been moved circumferentially into the desired position relative to openings 312.

To control the volume of airflow, in this example, sheets 332 and 334 include a relatively small opening 320 and a moderately-sized opening 322, either of which can be moved in and out of registry with openings 312 in sidewall 326, thereby determining the airflow restriction therethrough. FIG. 31 shows sheet 332 in a more-open position than sheet 334. While two openings are defined in each of the sheets 332 and 334, any other number of openings (1, 3, 4, 5, etc.) may be defined having similar or different size(s) and/or shape(s). In some examples, flaps, louvers or other airflow directional devices may be positioned and/or coupled adjacent to one or more of the openings.

Figure 32:
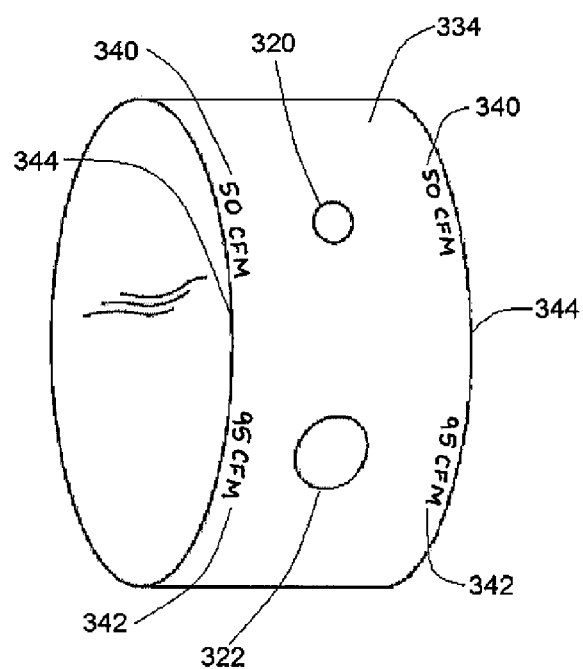
FIG. 32 is a perspective view of one of the movable sheets shown in duct assembly of FIG. 31.

A variety of techniques may be used to form sheets 332 and 334 into a band capable of completely surrounding, or overlaying, the circumference of duct sidewall 326. For example, sheet 334, as shown in FIG. 32, may be formed by sewing opposite ends of sheet 334 together to form a substantially continuous band, into which pliable duct 328 may be inserted. Sheet 332, as shown in FIG. 33, may be formed into a band by connecting opposite ends 338 via fasteners 336 (e.g., touch-and-hold fastener, adhesive, zippers, buttons, etc.).

Because sheets 332 and 334 are used to establish an airflow discharge rate and/or airflow characteristic (e.g., flow direction) for a duct system (often measured in cubic feet per minute or CFM, mass flow rate), it may be desirable to provide an indication of the airflow discharge rate (e.g., approximate airflow discharge rate) and/or airflow characteristic that is associated with each opening 320 and 322 in sheets 332 and 334. An indicia or indicium of airflow discharge rate associated with each opening 320 and 322 in sheets 332 or 334 enables a user (e.g., installer, salesperson, stocker, etc.) to quickly ascertain which sheet and opening will best fit their needs.

Figure 33:
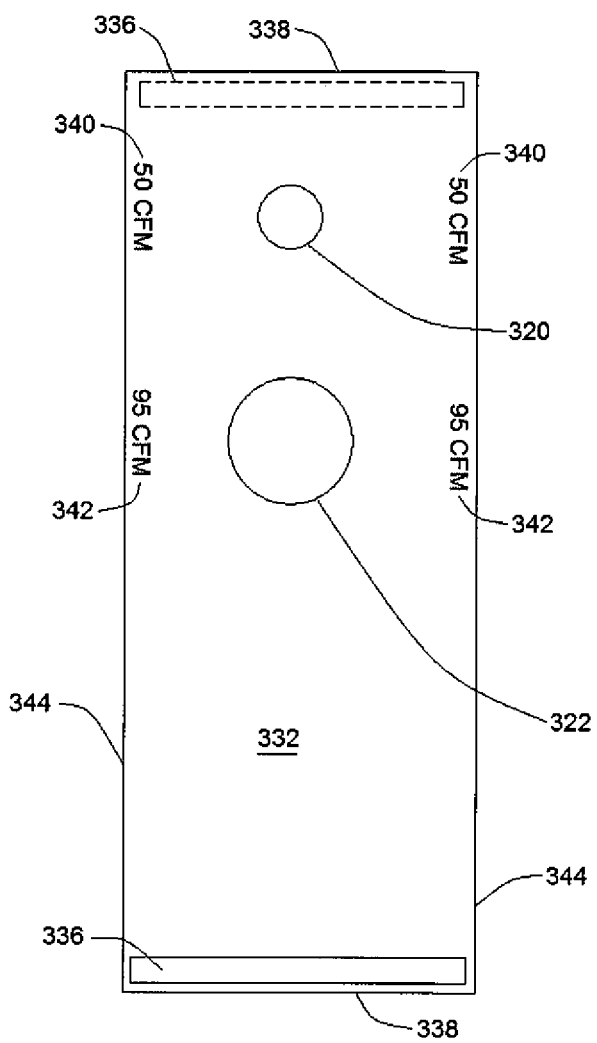
FIG. 33 is a side view of one of the movable sheets shown in the duct assembly of FIG. 31.

As shown in FIGS. 32 and 33, first airflow indicia 340 corresponding to the airflow rate (e.g., 50 CFM) discharged out of small opening 320 under a normal, predefined operating condition are provided on opposite sides of openings 320 adjacent lateral edges 344 of sheets 332 and 334. The predefined condition may be associated with the amount of airflow through the small opening 320 when the small opening 320 is in registry with the opening 312 and there is a particular static pressure in the duct 328, for example. In some examples, the static pressure is 0.5" water gauge during normal operating conditions. Similarly, second air flow indicia 342 corresponding to the airflow rate (e.g. 95 CFM) discharged out of moderately-sized openings 322 under a normal, predefined operating condition are provided on opposite sides of opening 322 adjacent lateral edges 344 of sheets 332 and 334. The predefined condition may be associated with the amount of airflow through the moderately-sized opening 322 when the moderately sized opening 322 is in registry with the opening 312 and there is a particular static pressure in the duct 328, for example. First and second airflow indicia 340 and 342 may be added to sheets 332 and 334 via ink printing, sewing, stamping, adhesive label, or other substantially permanent method. Although first and second airflow indicia 340 and 342 are shown adjacent each lateral edge 344, it may be sufficient to include the indicia adjacent only one lateral edge of sheets 332 and 334 or otherwise adjacent to the respective opening. In the illustrated examples, first and second airflow indicia 340 and 342 are disposed to enable the indicia to be at least partially covered by circumferential lips 318 and 330. Specifically, in the illustrated example, first and second airflow indicia 340 and 342 are disposed at lateral edges 344 because the indicia will be covered by circumferential lips 318 and 330 when sheets 332 and 334 are installed, leaving a clean appearance, but airflow indicia 340 and 342 need only be disposed in a position that allows the user to identify which opening 320 or 322 the airflow indicia correspond to (e.g., in the vicinity of and/or adjacent to opening 320 or 322).

Regardless of where the airflow indicia 340 or 342 are disposed on sheets 332 or 334, indicia of the airflow rate associated with each opening 320 and 322 should allow a user to quickly ascertain which sheet and opening will best fit their needs.

Some of the aforementioned examples may include one or more features and/or benefits including, but not limited to, the following:

In some examples, inflatable ducts of various diameters and lengths can be created by selectively assembling pre-existing stock pieces in different combinations.

In some examples, an elbow is attachable in different orientations to an inflatable tube to direct airflow in alternate directions.

In some examples, a pliable sheet provides a flexible register that can deflect with the inflation and deflation of an inflatable tube.

In some examples, a flexible sheet register in the form of a band that encircles an inflatable tube such that when the tube is inflated, the radially expanded tube helps hold the band in position.

In some examples, a pliable inflatable tube includes integral flaps or louvers that deflect open in response to air pressure within the tube.

In some examples, a pliable inflatable air duct includes one or more cutout patterns that provide guidance in creating a discharge opening of the proper size and location.

Although certain example methods, apparatus and articles of manufacture have been described herein, the scope of the coverage of this patent is not limited thereto. On the contrary, this patent covers all methods, apparatus and articles of manufacture fairly falling within the scope of the appended claims either literally or under the doctrine of equivalents.

The invention claimed is:

1. An inflatable air duct assembly comprising:
a tube comprising a pliable sidewall, the pliable sidewall defining a first opening therethrough and a pair of lips extending circumferentially around the tube; and
a pliable sheet to extend circumferentially at least partially around the tube to overlie the pliable sidewall, the pliable sheet comprising:
a second opening that is smaller than the first opening, the pliable sheet to be selectively positionable relative to the first opening so that the second opening overlays the first opening to control the amount of airflow discharged out of the openings; and
a first indicium indicative of the rate of airflow discharged out of the second opening under predefined operating conditions, the first indicium being disposed on the pliable sheet in the vicinity of the second opening;
the pair of lips to hold the pliable sheet to the tube, an inner surface of the pliable sheet to be held directly against the pliable sidewall by the pair of lips interacting with an outer surface of the pliable sheet opposite the inner surface, the inner surface of the pliable sheet to contact solely the pliable sidewall.

2. The inflatable air duct assembly of claim 1, wherein the pliable sheet includes a third opening that is larger than the second opening and a second indicium indicative of the rate of airflow out of the third opening under the predefined operating conditions, the second indicium being disposed on the pliable sheet in the vicinity of the third opening.

3. The inflatable air duct assembly of claim 1, wherein the pliable sheet is adjustably movable circumferentially at least partially around the tube.

4. The inflatable air duct assembly of claim 1, wherein the pliable sheet extends fully circumferentially around the tube.

5. The inflatable air duct assembly of claim 1, wherein the pliable sheet is a band joined at opposite ends thereof 6. The inflatable air duct assembly of claim 1, wherein the pliable sheet is adjacent an exterior surface of the tube.

7. The inflatable air duct assembly of claim 1, wherein the pair of lips are to be spaced apart axially from each other, the pliable sheet being interposed between the pair of lips.

8. The inflatable air duct assembly of claim 1, further comprising an elongate member attached to the pliable sheet to facilitate a positional adjustment of the pliable sheet.

9. The inflatable air duct assembly of claim 1,
a second pliable sheet to extend circumferentially at least partially around the tube to overlie the pliable sidewall, the second pliable sheet comprising a third opening, the second pliable sheet to be selectively positionable relative to a fourth opening in the pliable sidewall so that the third opening overlays the fourth opening to control the amount of airflow discharged out of the third and fourth openings.

\* \* \* \* \*